United States Patent [19]

Krauter

[11] Patent Number: 5,066,122
[45] Date of Patent: Nov. 19, 1991

[54] HOOKING CAP FOR BORESCOPE

[75] Inventor: Allan I. Krauter, Syracuse, N.Y.

[73] Assignee: Welch Allyn, Inc., Skaneateles Falls, N.Y.

[21] Appl. No.: 609,464

[22] Filed: Nov. 5, 1990

[51] Int. Cl.⁵ ...................... G02B 23/16; G02B 23/24
[52] U.S. Cl. ..................................... 356/241; 385/117
[58] Field of Search ...................... 356/241; 350/96.26

[56] References Cited

U.S. PATENT DOCUMENTS 4,298,312 11/1981 MacKenzie et al. ........ 350/96.26 X

Primary Examiner—Vincent P. McGraw
Attorney, Agent, or Firm—Wall and Roehrig

[57] ABSTRACT

A flexible borescope for penetrating a passage into an inaccessible area of a jet engine or other device to be visually inspected has an imaging system disposed at its distal tip, and conducts the image to a viewing device coupled to a proximal end of the insertion tube. A hooking cap can be controllably latched onto and removed from a projection in the inaccessible area, for example, the trailing edge of one of the blades of a turbine rotor. The hooking cap has a circumferential sleeve portion that overfits the borescope tip and wing portions that project tangentially outward from the sleeve so their wing tips substantially meet. The wing tips hook over the projection. The hooking cap is formed unitarily of aluminum sheet, with tabs that engage respective shoulders formed in the borescope tip for positioning the cap rotationally and axially.

17 Claims, 5 Drawing Sheets

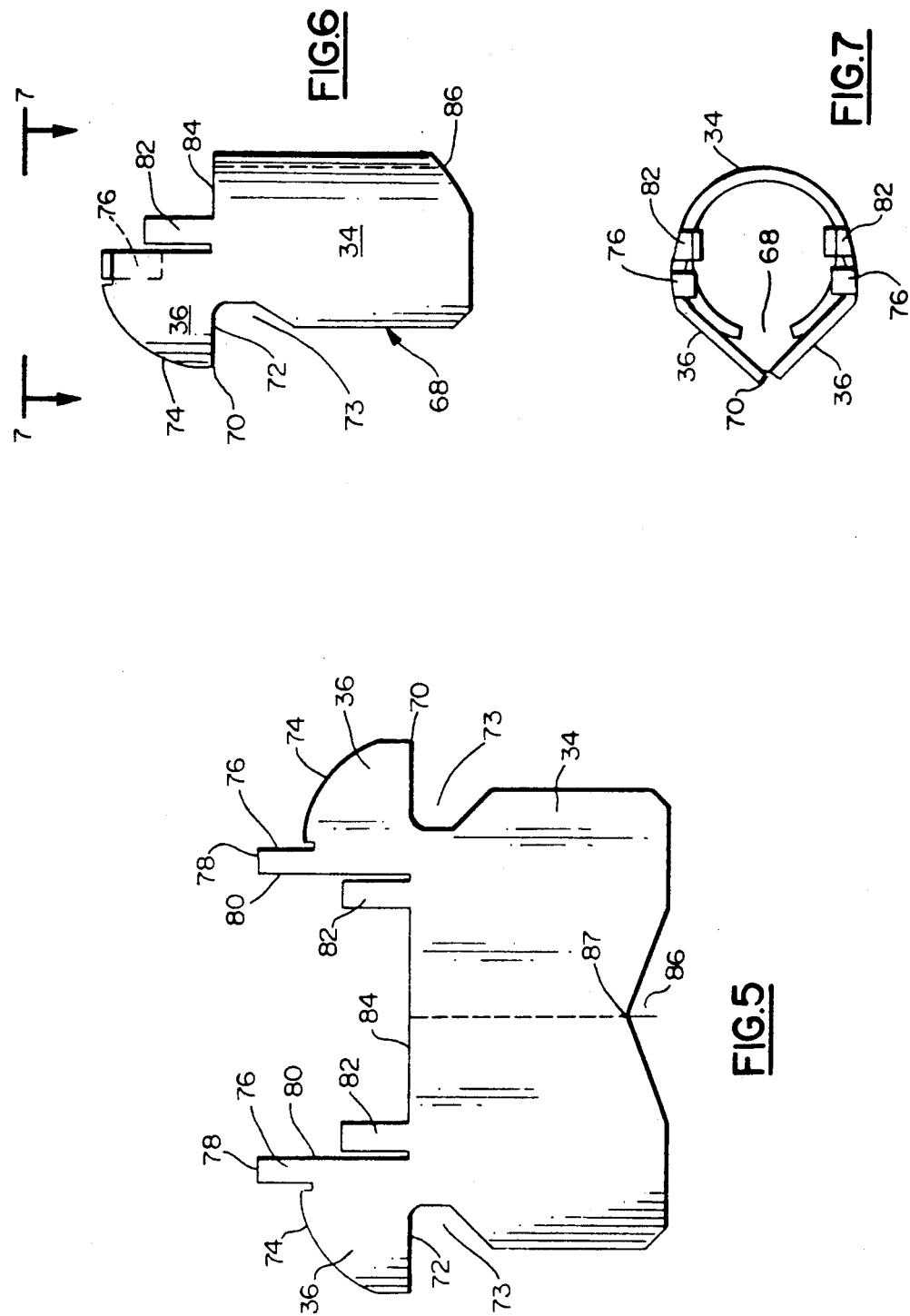

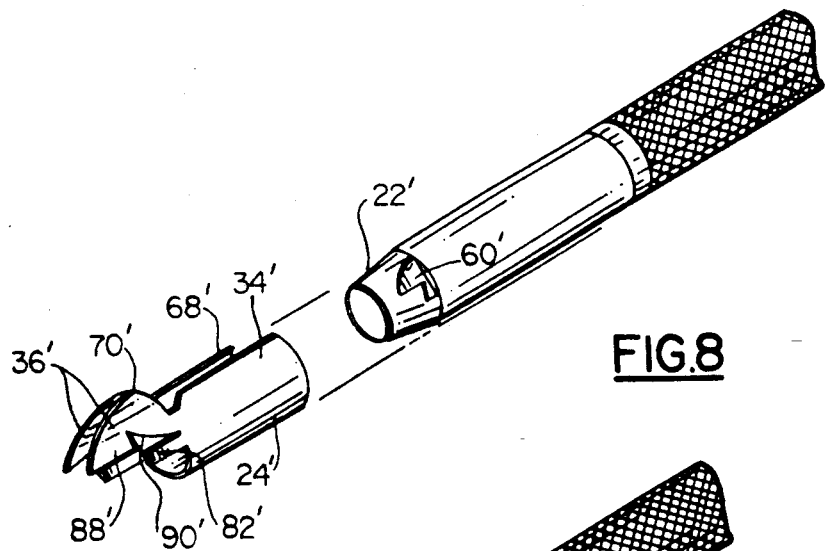
FIG.8
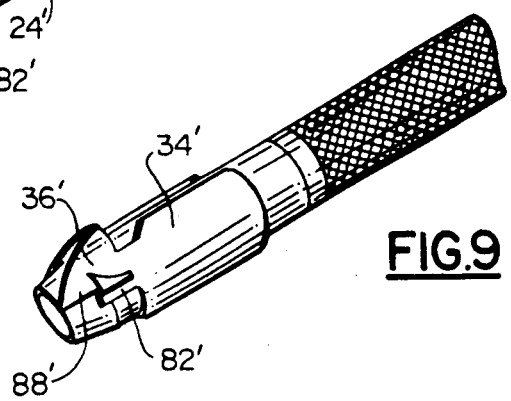
FIG.9
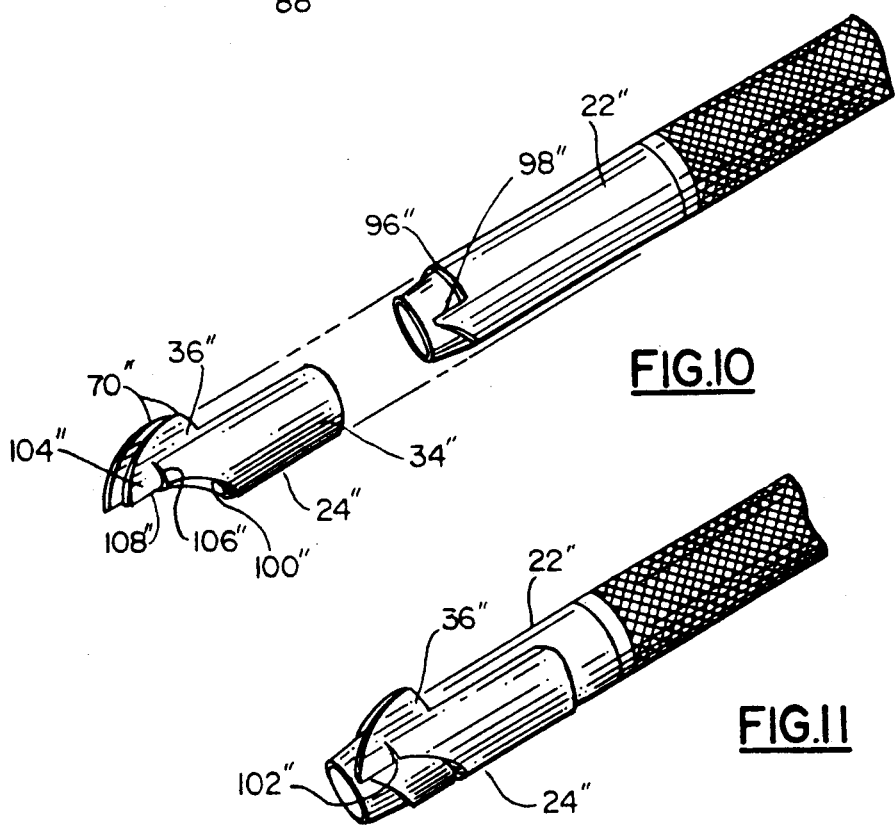
FIG.10
FIG.11

HOOKING CAP FOR BORESCOPE

BACKGROUND OF THE INVENTION

The present invention relates to industrial borescopes, especially flexible borescopes of the type that can be employed to inspect the condition of a gas turbine or jet engine.

Borescopes of this type have elongated flexible probes, which can have either a miniature video camera at the distal tip or a fiber optic imaging system extending the length of the probe. These probes are employed to penetrate into an inaccessible area of a jet engine or other object to view a target area inside it. Flexible borescopes are often employed to inspect vanes of a stator row in a turbine for foreign object damage. An aeronautical jet engine typically has an inspection port that receives a guide tube which extends from outside the engine to a position near the first stator row. The flexible probe is inserted through the guide tube and then is passed through the vanes of the first stator row into the rotor. There, the tip of the flexible probe latches onto a trailing edge of one of the rotor blades, or else is wedged between two adjacent rotor blades. The jet engine maintenance operator can then observe the leading edges of the vanes in the next stator row as the rotor is slowly turned. This procedure typically permits inspection of one half of the stator vanes in the second row. Then, the rotor is reversed one half turn and the probe is removed. Following this, the probe and guide tube are inserted into a second inspection port and the remaining stator vanes in the second row are inspected in a similar fashion. In some engines, only one inspection port is available so that the borescope must be sufficiently long to inspect all the stator vanes in the second row. Inspection by means of a flexible borescope permits the most susceptible parts of the jet engine or gas turbine to be inspected without disassembling the engine.

A flexible probe which employs an inflatable bladder mechanism for lodging the borescope tip between rotor vanes is described in U.S. Pat. No. 3,841,764. Probes of this type require an inflatable bag or bladder, an inflating mechanism, and an air tube which runs the length of the flexible probe beneath its outer sheath.

Another borescope employs a forceps hook to latch onto the trailing edge of the rotor blades, and is described in U.S. Pat. No. 4,847,817. In this arrangement, an aluminum hook is screwed onto an elongated flexible cable that passes through a tool forceps channel within the insertion tube. In arrangements of this type, the hook can become difficult to manipulate as the operator is required to rotate the cable within the forceps channel to orient the hook. At the same time, the operator must also steer the probe and manipulate its insertion tube.

Both of the above-mentioned prior systems require the borescopes to have additional channels within them, either to inflate the bladder, or to carry the hook cable. Consequently, the borescope insertion tube is of a greater diameter and is somewhat more complex and costly than if the additional channels were omitted.

A hooking cap for borescopes has been described in my copending U.S. Pat. application Ser. No. 451,016 filed Dec. 15, 1989, and having a common assignee herewith. In that case, a hooking cap is removably attached onto the distal tip of the borescope insertion tube; the hooking cap has a flange that can be latched onto and removed from a projection such as the trailing edge of one of the blades of the rotor of a jet engine being inspected and/or serviced. In the various embodiments of the hook cap disclosed in this earlier patent application, the hook cap has a tubular sleeve that overfits the tip of the borescope and a flange that projects radially out from a distal end of the sleeve. In one version the hook flange is annular, but in other versions it can be lobate. The engaging side of the flange can be flat, or can be bent back proximally. As there disclosed, the sleeve can have one or more inwardly projecting lips that engage corresponding transverse slots on the insertion tube tip. The lips are constructed to release from the slots if a predetermined axial breakaway force is exceeded. The hook cap is entirely of aluminum or another material that will be consumed in combustion if it is lost from the borescope tip, and so it will not cause foreign object damage to the jet engine or turbine.

These hook caps are cast aluminum or machined aluminum, and can be difficult to produce to tolerance, except at considerable cost. Also, the finite thickness of the sleeve can push the probe's line of sight away from the engine axis, thus rendering some portions of the stator vanes difficult to see clearly. Moreover, because the hook flange protrudes from both sides of the probe tip, the hook can engage the rotor blade backwards or can wedge into the space between blades. This can increase the frequency of hook cap loss, making consumption of the hook caps much higher than it ought to be.

OBJECTS AND SUMMARY OF THE INVENTION

Accordingly, it is an object of this invention to facilitate visual inspection of the vanes in the second stator row of a jet engine or gas turbine with a borescope or similar elongated flexible probe.

It is another object of this invention to provide simple structure which can be easily attached onto a trailing edge of a rotor blade, and then can be removed from the rotor blade without difficulty when desired.

It is yet another object of this invention to provide attachment structure which permits the use of a flexible optical or video borescope without a forceps channel or fluid conduit.

It is still another object of this invention to provide an attachment device for a jet engine inspection probe which can have either two-way or four-way steering.

It is a further object to provide simple and inexpensive structure for a hook cap for an elongated probe which is simple to attach and remove, and which achieves improved viewing characteristics for inspecting the vanes in the second stator row of jet engines or turbines.

In accordance with a significant aspect of this invention, a flexible borescope has an elongated flexible insertion tube for penetrating a passage into an inaccessible area of a device to be visually inspected, such as the turbine mechanism of a jet engine. The probe has an imaging system, which can be e.g. a miniature video camera or a fiber optic system, disposed at the distal tip of the insertion tube for forming an image of a target in the inaccessible area and for conducting the image to a viewing device that is coupled to a proximal end of the insertion tube. The distal tip of the borescope has a generally cylindrical wall in which one or more cutouts are formed, each cutout having an axial shoulder and a circumferential shoulder.

A hooking member is removably attached onto the distal tip of the insertion tube for controllably latching onto a projection in an inaccessible area, such as the trailing edge of a rotor blade. The hooking member includes a circumferential sleeve portion that overfits the insertion tube tip and at least one wing whose tip projects generally radially out from the sleeve portion sufficiently to engage the rotor blade trailing edge or other projection. Each such wing includes a tab that has an axial edge and a circumferential edge to engage the axial and circumferential shoulders of an associated one of the one or more cutouts. This firmly locates the hook member circumferentially and axially on the distal tip of the borescope. This establishes a fixed relation for the hook member circumferentially (to establish an azimuth for bending neck articulation and for the vertical picture axis of the imager) and axially (to position the imager optimally for viewing the stator vanes).

Preferably, the hook members are formed unitarily of sheet aluminum. The sleeve portion is formed with a gap that extends its axial length. Two wings are joined to the distal end of the sleeve portion, and these angle towards each other so that their tips touch or substantially touch at a position on the same side as the gap. The presence of the gap allows the tip of the probe to align closer to the axial direction of the engine so that a better view is obtained of the leading edges of the stator vanes.

The tabs mentioned above can be formed as defined by cutouts on the wings at a position circumferentially away from the tip. Alternatively the tabs can include axial strips at the distal ends of the wings, these strips being bent back against an inside surface of the wing at an edge away from the wing tip. An additional locking tab can project distally from the sleeve adjacent the wing to engage another circumferential shoulder of the cutout and yieldably to lock the hook member onto the probe tip.

The wing of the hooking member can be easily and securely hooked over the trailing edge of the jet engine rotor blade, and will not come off inadvertently. However, when desired to remove the probe from the engine, the hooking member can be dislodged by rotating the insertion tube. This causes the wing tip to roll off the trailing edge of the blade and become dislodged.

The hooking member is unitarily fabricated of aluminum. If the cap is lost in the jet engine, it will become consumed at the engine's characteristic operating temperatures, and thus will not cause any damage to the engine.

The probe is employed by inserting it through the guide tube which has been installed in the engine's or turbine's inspection port, and by hooking the wings over the trailing edge of the rotor blade. Then the rotor is turned slowly for a half rotation, so that the leading edges of the second row of stator vanes come into view. After these stator vanes have been inspected, the rotor is turned back to its original position. The operator them simply twists the insertion tube to dislodge the hooking member by rolling it off from the rotor blade. Then the probe is pulled out of the guide tube and, using a similar procedure, is inserted through the guide tube which has been installed in this second port. The probe is then used to inspect the remaining stator vanes. In some engines only one inspection port is available, so that the rotor is turned a full rotation to inspect the stator vanes.

The above and many other objects, features and advantages of this invention will be more fully understood from the ensuing description of a preferred embodiment, which is to be read in connection with the accompanying Drawing.

BRIEF DESCRIPTION OF THE DRAWING

FIG. 5 is a plan view of a cut sheet blank for forming the hooking device of this embodiment.

FIG. 6 is a side elevation of the hooking device of this embodiment.

FIG. 7 is an end view taken at lines 7—7 of FIGS. 6.

FIG. 8 and 9 are perspective views of the distal end of a borescope and a hooking device according to a second embodiment, with the hooking device respectively shown removed and installed on the borescope.

FIGS. 10 and 11 are perspective views of the distal end of a borescope and a hooking device of a third embodiment, with the hooking device respectively shown removed and installed on the borescope.

DETAILED DESCRIPTION OF THE PREFERRED EMBODIMENT

Figure 1:
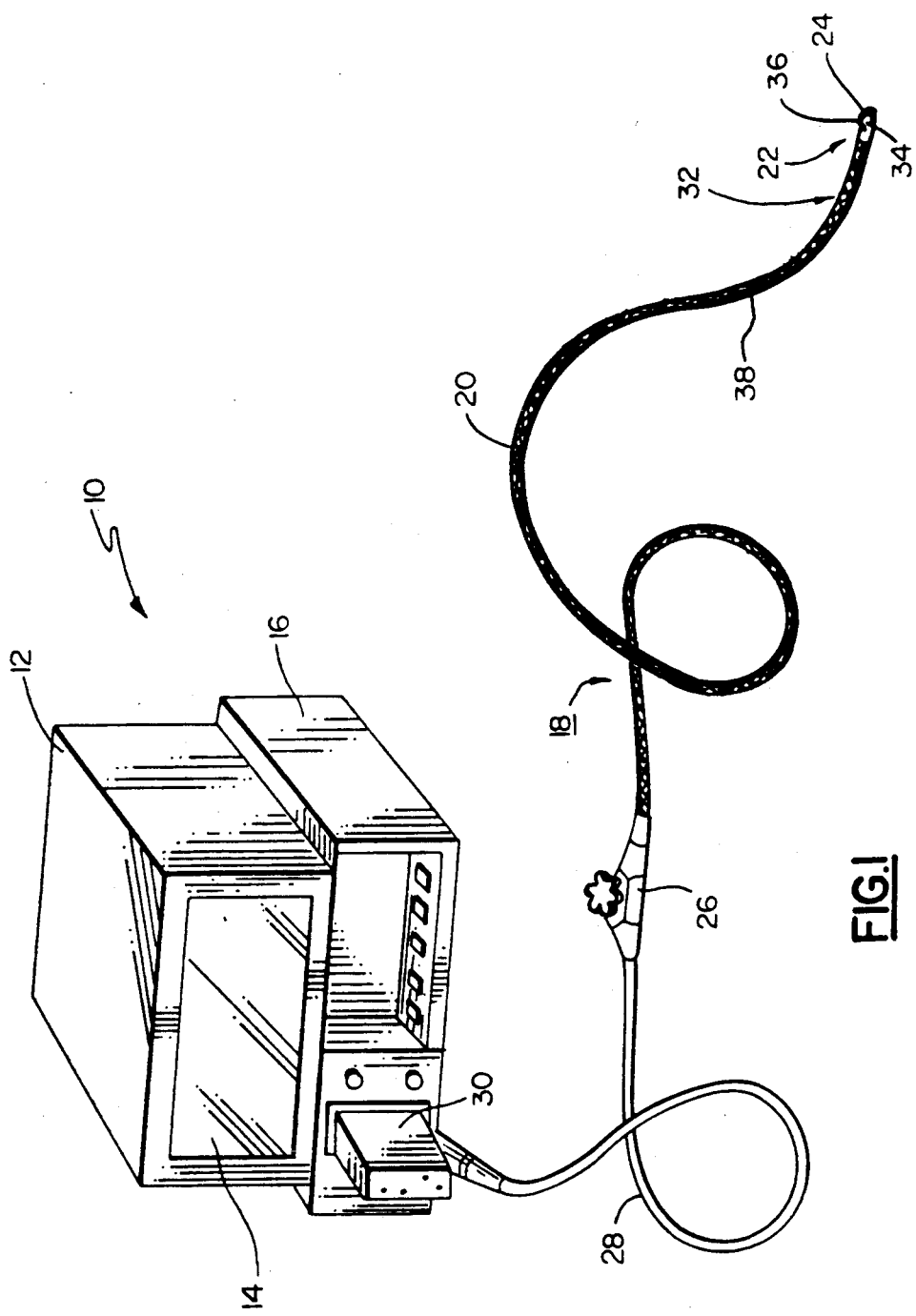
FIG. 1 is a perspective assembly view of a borescope that employs a hooking device according to one embodiment of this invention.

With reference to the Drawing, FIG. 1 shows a video borescope and processor assembly 10 which comprises a video monitor 12 having a screen 14, and an electronic processor 16. An associated borescope 18 has an elongated flexible insertion tube 20 that can be up to fifty feet (sixteen meters) in length, and which has a viewing head incorporated into its distal tip 22. This viewing head contains an optical lens and a miniature video camera. The latter can be formed of a CCD device or other solid-state imager capable of providing a full-color image of a remote target area, e.g., the inside of a boiler tube heat exchanger or a stator vane of a jet engine or gas turbine. An example of a suitable solid-state imager is disclosed in U.S. Pat. No. 4,491,865.

At the distal tip 22 of the insertion tube there is a hooking device 24 in the form of an end cap. The device 24 hooks over a protuberance or protrusion in a remote area, as described later.

At the back or proximal end of the insertion tube 20 is a steering and control unit 26 that can be manipulated by an operator to bend a steering section 32 at the front or distal portion of the insertion tube adjacent the viewing head or tip 22. The control unit 26 couples the insertion tube 20 to a flexible tubular umbilical 28. At the proximal end of the umbilical 28 is a borescope interface module 30 of the plug-in type, substantially as disclosed in U.S. Pat. No. 4,539,586. In this embodiment, the module 28 fits a mating receptacle in the processor 16.

As also shown generally in FIG. 1, the hooking device 24 has a sleeve portion 34 that fits snugly onto the distal tip 22 of the insertion tube and at least one wing 36 that projects outward from the distal side of the sleeve portion 34.

In this embodiment, the steering section 32 bends in one plane only, that is, up and down in a vertical plane. A stripe 38 appears on the sheath of the insertion tube 20 and extends axially over the operative length of the insertion tube. This stripe lies in the vertical plane, i.e., the bending plane of the steering section 32 and indicates the "up" steering direction. The stripe provides a visual indication to the operator of the orientation of the insertion tube 20 and steering section 32 when the borescope is inserted into an inaccessible area. This is a significant advantage to the operator in orienting the borescope and threading the same through the stator vanes and rotor blades of a jet turbine so that the hooking device or cap 24 can be easily hooked onto the trailing edge of one of the rotor blades. For a probe with four-way steering, distinctive stripes or markings on the sheath of the insertion tube can indicate the horizontal and vertical steering planes and e.g., the "up" and "right" steering directions.

Figure 2:
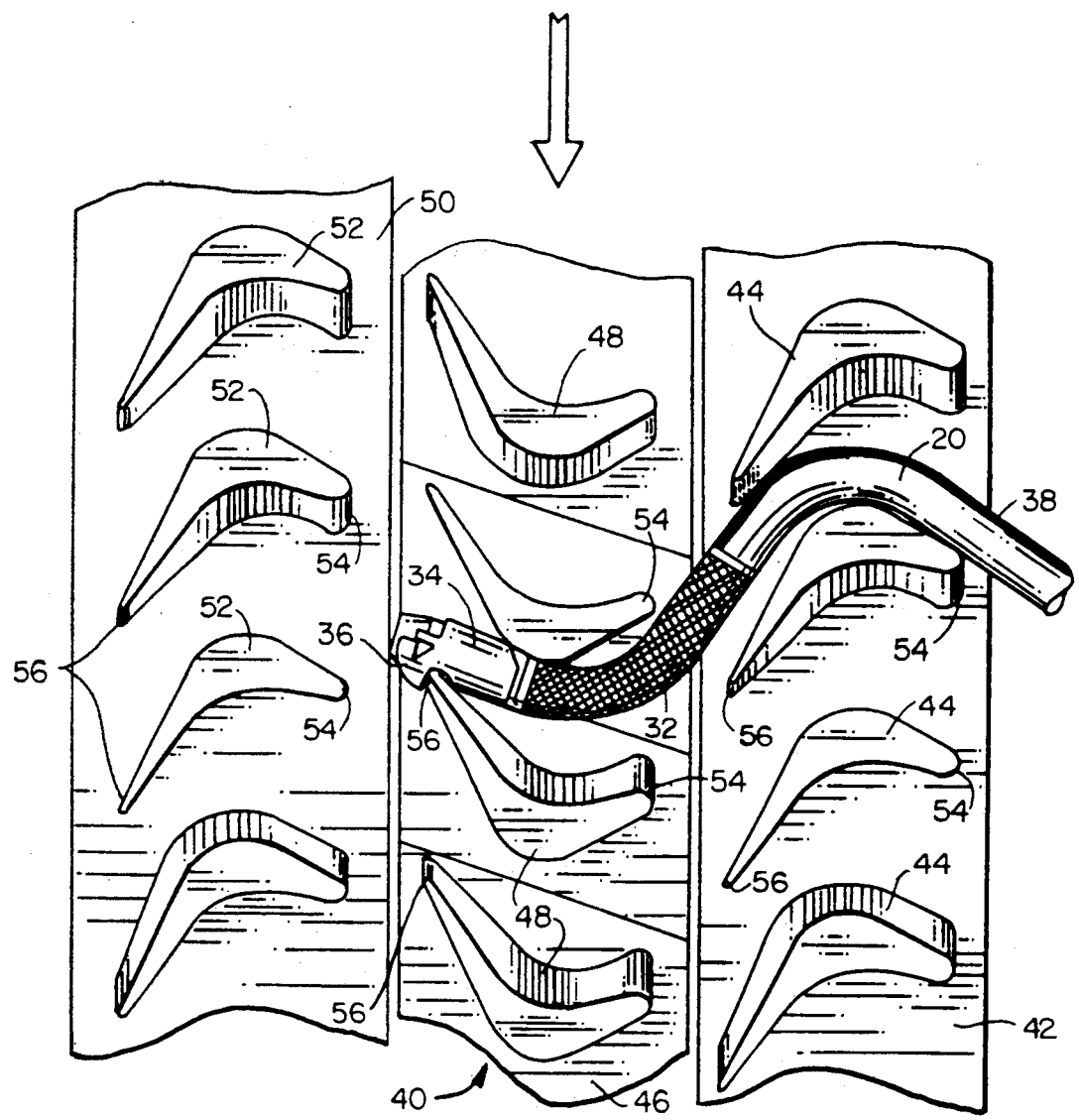
FIG. 2 is a sectional representation of a portion of a turbine jet engine in which the borescope of this invention is employed for inspection purposes.

FIG. 2 shows the distal end of the borescope insertion tube 20 after it has penetrated into a jet engine 40 for inspection of same. In this view, the direction of gas flow is right to left, so that the leading edges of the stator vanes and rotor blades are to the right, and their trailing edges are oriented to the left.

The engine 40 has a first stator row 42 formed of a plurality of spaced stator vanes 44, a rotor 46, on which there are a plurality of spaced rotor blades 48, and a second stator row 50 which has a plurality of spaced stator vanes 52. The vanes 44, 52 and the blades 48 have rounded leading edges 54 and pointed trailing edges 56. Generally the first row stator vanes 44 and the rotor blades 48 can be inspected without difficulty. However, it is the leading edges 54 of the stator vanes 52 of the second row that are also subject to hidden damage. These vanes 52 require the subject probe for inspection. Rotor and stator elements behind the second stator row 50 have a low incidence of damage, making routine inspection unnecessary in most cases.

To inspect the leading edges 54 of the vanes 52, the borescope insertion tube 20 is inserted through a guide tube (not shown) into the engine 40. The guide tube positions the insertion tube to enter between a pair of the first row stator vanes 44. The operator maintains the bending plane of the steering section 32 in the plane tangent to the engine's periphery at the inspection location by observing the stripe 38 on the insertion tube as it is passed into the guide tube. This allows the steering section to conform with the curves in the blades 44 and 48. Then, by manipulating the control unit 26, the operator latches the wing or wings 36 of the device 24 onto the trailing edge 56 of one of the rotor blades 48. The rotor 46 is then slowly turned in the direction of the arrow of FIG. 2, and this carries the insertion tube so that the tip 22 passes each of the stator vanes 52 in succession. After these vanes have been inspected, the rotor 46 is turned reversely back to its original position for withdrawal of the insertion tube 20. To unlatch the device 24, the operator relaxes the bending section 32 and rotates the insertion tube 20 approximately ninety degrees. This causes the wing 36 to roll out of engagement with the trailing edge 56 of the blade 48. Then the insertion tube can be easily withdrawn.

With the above-described procedure, half of the total rotor vanes 56 are typically inspected. The operation is repeated to inspect the remaining half by inserting the borescope through the guide tube into a radially opposite inspection port on the other side of the engine 40. Then like procedures are followed to inspect the remaining stator vanes 52.

It has been found that the end cap hooking device 24 of this invention is extremely simple to employ, both in making the necessary engagement with and in disengaging from the rotor blade trailing edge. Also, because the device 24 employs no moving parts which must be manipulated through a forceps channel or air conduit, the borescope insertion tube can be made without provision for such conduits or channels. Thus, with this invention, the borescope that is employed can be made thinner and more flexible than was possible previously.

The direction of rotor rotation indicated above for pulling the probe into the engine is the same as the rotation direction for engine operation. The inspection can be performed either during this forward rotation of the rotor or during withdrawal of the probe when the rotation of the rotor is reversed.

The hooking device 24 is designed to pull off from or break away from the distal tip 22 if a predetermined axial force is exceeded. This permits the borescope to be removed without damage to itself or the engine in case the distal tip becomes jammed.

Because the end cap or hooking device 24 is formed entirely of soft aluminum, a material which becomes entirely consumed at the combustion temperatures of the jet engine, a lost end cap or hooking device can remain in the engine without threat of damage to any of the rotor blades or stator vanes.

Figure 3:
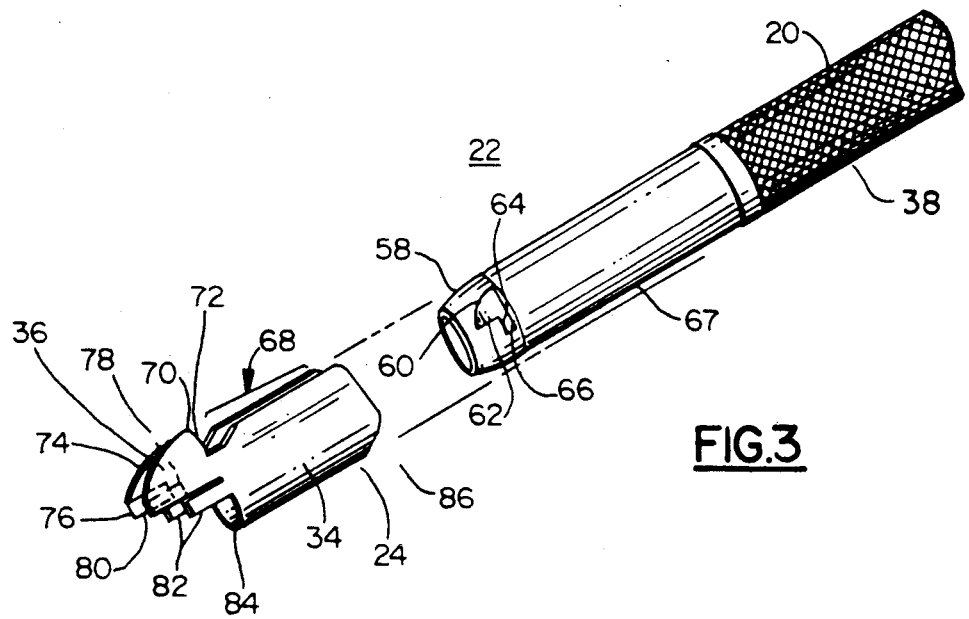
FIGS. 3 and 4 are perspective views of the distal end of the borescope with the hooking device removed and installed, respectively.
Figure 4:
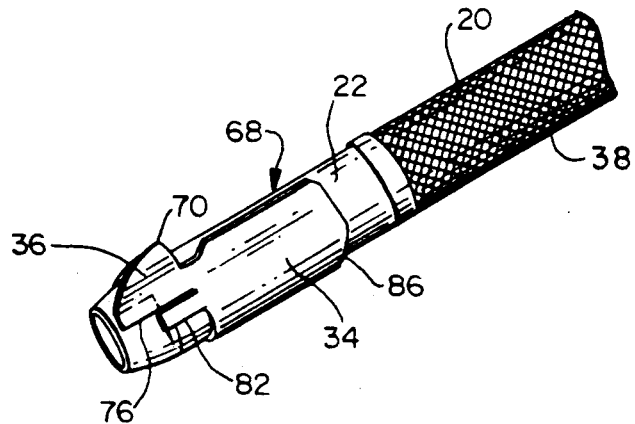

The manner in which the hooking device 24 of this invention fits onto the tip or video head 22 of the borescope is illustrated generally in FIGS. 3 and 4. The tip has a frustoconic or generally cylindrical distal portion 58 in which is formed a generally a L-shaped cutout 60. The cutout has an axial shoulder 62, a distal circumferential shoulder 64, and a proximal circumferential shoulder 66. There is a second cut-out, not visible in this view, which is opposite the cutout 60 on the portion 58 and is a mirror image thereof.

The hooking cap 24 has a sleeve portion 34 and two wing portions 36, which are mirror images of one another, positioned distally on the sleeve portion 34. Aligned between the wing portions 36 and extending axially along the sleeve portion 34 is a longitudinal gap 68. The presence of this gap means that the sleeve portion 34 does not add material thickness on the side of the viewing head 22 that abuts the trailing edge 56 of the rotor blades 48.

Each of the wing portions 36 extends laterally, i.e., radially out to a point or wing tip 70 with a radially flat proximal edge 72 extending out to the tip 70, and a curved or swept back distal or leading edge 74. In other embodiments the proximal edge 72 can be slanted back somewhat.

An axial strip 76 is formed at the distal end of each wing 36 at the side opposite the tip 70. The strip 76 is bent inward so that its free end forms a proximal circumferential edge 78 and its side forms an axial edge 80. When the hooking member 24 is installed onto the borescope viewing head 22, the bent-back tabs 76 engage the cutouts 60, with the circumferential edges 78 engaging the cutout circumferential shoulders 66, and with the axial edges 80 engaging cutout axial shoulders 62. The tabs 76 and cooperating cutouts 60 serve to locate the hooking device 24 accurately on the borescope head, both axially and rotationally. This ensures that the viewing head is properly positioned and oriented to produce an erect, in-focus image of the proper magnification.

Additional tabs 82 project axially from adjacent the wings 36. These tabs engage the distal circumferential edges 64 of the cutouts 60 and lock the hooking device in place. The tabs 82 establish a predetermined, predictable breakaway force at which the tabs 82 will yield to excess axial tensile force and permit the hooking device to be sacrificed if the same becomes jammed.

Between the tabs 82 is a fingernail edge 84 of the sleeve portion 34 opposite the wing tips 70. This fingernail edge allows the user to push the hooking cap 24 onto the head 22 easily. At the proximal end of the sleeve portion 34 and opposite the gap 68 is a v-shaped cutout 86. This cutout 86 avoids contact of the hooking cap 24 and the adjacent rotor blade 48 and thereby permits the viewing head 22 to be aligned closer to the axial direction in the engine 40 for better viewing of the stator vane leading edges 54. The cutouts also reduce the risk of crowbarring or jamming when the borescope is being withdrawn from the engine after inspection.

The construction of the hooking device or end cap 24 of this embodiment can be seen in FIGS. 5, 6, and 7. FIG. 5 shows a flat blank of aluminum sheet, preferably a soft aluminum such as 6061-0 or another suitable material which is durable but would be entirely consumed in jet engine operation if lost in the engine. As shown in FIGS. 6 and 7, the two wings 36 do not proceed radially out to the hooking point where their tips 70 touch or substantially touch. Rather the wings 36 proceed tangentially from the radius of the sleeve portion 34. This provides for easy release of the cap or hooking member from the blade trailing edge 56 when the probe insertion tube 20 is twisted.

The axial gap 68 serves several purposes. First, the gap 68 provides clearance so that the blade trailing edge 56 contacts the viewing head 22 rather than the cap or hooking device 24. This maintains a more axial orientation of the probe for a better view of the stator vanes 52. Second, the lack of material in the gap 68 reduces any tendency for the probe to lodge between the blades 48 if it is inserted backwards. Third, the gap 68 permits the sleeve portion 34 to spring by radial flexing of the region diametrically opposite the gap. This spring action, in combination with the low yield point of the aluminum material, helps control the radial force of engagement between the hooking device 24 and viewing head 22. Fourth, the gap 68 allows the hooking device to be made from an aluminum sheet rather than be machined from an aluminum rod or tube. Fifth, the existence of gap 68 allows the notch spaces 73 to be easily provided. These notch spaces 73 provide circumferential clearance for the trailing edge 56. With this circumferential clearance, slight angular misalignment of the hooking device 24 with respect to the trailing edge 56 will not cause the wings 36 to disengage from the trailing edge 56.

The V-shaped notch 86 prevents the sleeve portion 34 from contacting the adjacent rotor blade 48 when the probe is properly inserted and hooked. This notch 86 also helps align the hooking device 24 on the viewing head 22 when the hooking device 24 is installed onto the viewing head 22 by the user. To effect this alignment the user lines up the top 87 of the notch 86 with an axial mark 67 incorporated onto the head 22.

To remove the probe from the engine or turbine 40 following an inspection of the blades, the rotor 46 is returned to the original position. Then the insertion tube is rotated or twisted and the hooking cap will dislodge from the trailing edge 56 of the blade 48. The insertion tube 20 can then simply be withdrawn from the engine and guide tube. A similar insertion, inspection, and withdrawal procedure can be carried out using the remaining diametrically opposite inspection port.

A second embodiment of the hooking cap of this invention is shown in FIGS. 8 and 9. Here, the probe viewing head 22 is configured as in the first embodiment, with the L-shaped cutouts 60 on the frustoconic distal port 58 of the head 22. The basic construction of the associated hooking cap or device is similar to that of the previously-described embodiment, and similar parts are illustrated and identified with similar reference numbers, but primed.

As illustrated the hooking cap 24' of this embodiment, similar to that of the first embodiment, has a sleeve portion 34' and a pair of wing portions 36', and two tips 70'. A tab 88' is defined by a generally U-shaped cutout 90'. This creates in the tab 88' a circumferential edge that engages the circumferential shoulder 66 of the borescope cutout 60 and an axial edge that engages the axial shoulder 62.

A third embodiment of the hooking cap of this invention is illustrated in FIGS. 10 and 11. Parts that are similar to those of the previous embodiments are illustrated and identified with the same reference numbers, but double-primed.

In this embodiment, the head 22" of the probe has a slightly different configuration, with a circumferential shoulder 96" and an axial shoulder 98". Another shoulder which is the mirror image of the shoulder 98" is obscured.

The hooking cap 24" has a sleeve portion 34" and a pair of wing portions 36" joined to the distal end of the sleeve portion. There is a U-shaped relief area 100" between the wing portions. A circumferential slot 102" formed in each wing portion extends to the area 100" and defines a tab 104" in the wing portion at the side away from the wing tip 70". The tab 104" has a circumferential shoulder 106" and an axial edge 108" that engages the respective axial shoulder 98".

In this embodiment, the locking axial tab 82 is omitted. The sleeve portion 34" frictionally engages the cylindrical wall of the head 22", and this frictional engagement defines the required breakaway force. This can be adjusted somewhat by adjusting the spring fit of the sleeve portion 34".

In each case, the probe can be employed either with or without the associated hooking cap or hooking device 24, 24' or 24". The cutouts and shoulders on the probe tip or viewing head do not obstruct its passage into narrow passageways when used without the cap.

While the invention has been described in detail with reference to a few selected embodiments, it should be understood that the invention is not limited to those precise embodiments; rather, many modifications and variations would present themselves to those skilled in the art without departing from the scope and spirit of this invention, as defined in the appended claims.

What is claimed is:

1. A flexible borescope comprising a flexible elongated insertion tube for permitting a passage into an inaccessible area of a device to be visually inspected, imaging means disposed in a distal tip of said insertion tube for forming an image of a target in an inaccessible area and conducting the image to a viewing device coupled to a proximal end of the insertion tube, the distal tip having a peripheral wall in which a cutout is formed having an axial shoulder and a proximal circumferential shoulder, and a hook member removably attached onto the distal tip of the insertion tube for controllably latching onto a projection in said inaccessible area, the hook member including a sleeve circumferentially over-fitting said tip and at least one wing having a tip projecting to a hook point radially outward from a distal end of said sleeve to hook over said projection each said wing including a tab having an axial edge and a circumferential edge to engage the axial and circumferential shoulders of the associated cutout to firmly locate the hook member circumferentially and axially on the distal tip.

2. The flexible borescope of claim 1 wherein there are two of said cutouts disposed on said borescope tip and said hook member includes two said wings, each having an associated tab to engage a respective one of said cutouts.

3. The flexible borescope of claim 1 wherein said hook member is formed unitarily of a sheet of aluminum.

4. The flexible borescope of claim 1 wherein said sleeve has an axial gap therethrough generally aligned with said at least one wing.

5. The flexible borescope of claim 1 wherein each said tab is formed in its respective wing on a side thereof circumferentially away from its tip.

6. The flexible borescope of claim 5 wherein each said tab is formed by a cutout in said wing on the side away from its tip.

7. The flexible borescope of claim 5 wherein each said tab includes an axial strip at the distal end of said wing and bent back against said side away from the wing tip.

8. The flexible borescope of claim 5 further including a distal circumferential shoulder in said distal tip.

9. The flexible borescope of claim 8 further comprising a locking tab projecting distally from said sleeve adjacent said wing, said locking tab to engage said distal circumferential shoulder in said distal tip.

10. A hooking cap which removably attaches to a generally cylindrical distal tip of an elongated flexible borescope, the hooking cap comprising a generally cylindrical sleeve that circumferentially overfits said borescope distal tip; and at least one wing disposed at a distal end of said sleeve and projecting generally radially to a wing tip that lies radially outward of the tip of borescope a distance sufficient to permit hooking onto a projection, each said wing including a tab formed thereon on a side away from the wing tip, the tab having an axial edge and a circumferential edge to engage axial and proximal circumferential shoulders on the borescope distal tip.

11. The hooking cap of claim 10 wherein there are two of said wings having wing tips that project both to the same side of the borescope tip.

12. The hooking cap of claim 11 wherein said wings angle towards a common point such that the wing tips substantially meet.

13. The hooking cap of claim 11 wherein said sleeve has an axial gap therethrough disposed on the side at which the wing tips project.

14. The hooking cap of claim 10 wherein said sleeve and each said wing are all unitarily formed of aluminum sheet.

15. The hooking cap of claim 10 wherein each said tab is formed by a cutout in the associated wing on the side away from the wing tip.

16. The hooking cap of claim 10 wherein said tab includes an axial strip at a distal edge of one said wing, which strip is bent back against a side of the associated wing away from the wing tip.

17. The hooking cap of claim 10 further comprising a locking tab projecting distally from said sleeve adjacent an associated one of said at least one wing, said locking tab to engage said distal circumferential shoulder in said distal tip.

* * * * *